(12) United States Patent
Chae

(10) Patent No.: US 7,548,224 B2
(45) Date of Patent: Jun. 16, 2009

(54) IMAGE DISPLAY DEVICE AND OPERATING METHOD THEREOF

(75) Inventor: Gee Sung Chae, Incheon-si (KR)

(73) Assignee: LG Display Co., Ltd., Seoul (KR)

( * ) Notice: Subject to any disclaimer, the term of this patent is extended or adjusted under 35 U.S.C. 154(b) by 891 days.

(21) Appl. No.: 11/022,870

(22) Filed: Dec. 28, 2004

(65) Prior Publication Data

US 2005/0141239 A1      Jun. 30, 2005

(30) Foreign Application Priority Data

Dec. 29, 2003    (KR)    .................. 10-2003-0099342

(51) Int. Cl.
 *G09G 3/36*  (2006.01)
(52) U.S. Cl. ........................... 345/87; 345/102
(58) Field of Classification Search .................. 345/36, 345/39, 42, 45–48, 50, 64, 72, 76–77, 82–84, 345/87–92, 100, 102; 362/558–561, 601–612
See application file for complete search history.

(56) References Cited

U.S. PATENT DOCUMENTS

| 7,245,280 B2 * | 7/2007 | Park ............................. 345/84 |
| 7,278,775 B2 * | 10/2007 | Yeo et al. .................... 362/627 |
| 2003/0223218 A1 * | 12/2003 | Kawakami ................... 362/31 |

* cited by examiner

*Primary Examiner*—Richard Hjerpe
*Assistant Examiner*—Mansour M Said
(74) *Attorney, Agent, or Firm*—McKenna Long & Aldridge LLP

(57) ABSTRACT

Provided is an image display device including: an image signal controller generating a driving signal and an image data signal; an image light beam supply unit generating image light beams using a signal applied by the image signal controller; and a light guide plate having a mapping plate reflecting the light beams that are incident from the image light beam supply unit and a display plate receiving the light beams reflected by the mapping plate to display an image.

9 Claims, 8 Drawing Sheets

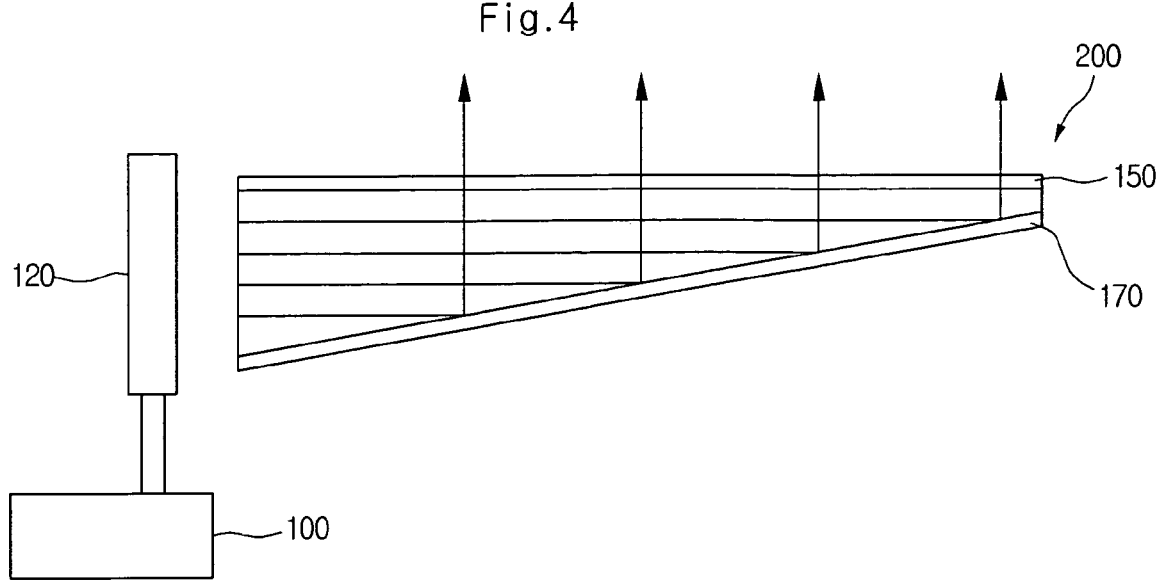

IMAGE DISPLAY DEVICE AND OPERATING METHOD THEREOF

This application claims the benefit of Korean Patent Application No. 2004-99342, filed in Korea on Dec. 29, 2004, which is hereby incorporated by reference for all purposes as if fully set forth herein.

BACKGROUND OF THE INVENTION

1. Field of the Invention

The present invention relates to an image display device and an operating method thereof.

2. Discussion of the Related Art

In recent years, image display device products having miniaturized and lightweight features, as well as powerful performance, have been produced.

The cathode ray tube (CRT) that has been widely used as an information display device has many advantages from the viewpoint of performance and price, but it also has many disadvantages from the viewpoint of miniaturization and portability.

On the contrary, the liquid crystal display device (LCD) has become a popular substitute for the CRT because of their small size, light weight and low power consumption. Thus, LCD devices have been employed in almost all information processing devices.

The LCD is driven by using the optical anisotropy and polarization properties of the liquid crystal material in the display. Because the liquid crystal molecules are thin and long, the arrangement direction of liquid crystal molecules may be controlled by selectively applying an electric field to the liquid crystal molecules having directionality and polarity. Accordingly, when the alignment direction is selectively controlled, the optical anisotropy of the liquid crystal causes the light to be transmitted or blocked along the arrangement direction of the liquid crystal molecules. In this manner, the color and image are displayed.

FIG. 1 illustrates an exploded perspective view of a related art LCD.

Referring to FIG. 1, the LCD includes a liquid crystal panel 5 and a backlight assembly 10. The liquid crystal panel 5 includes an array substrate on which a plurality of pixels are arranged in a matrix configuration, and a color filter substrate on which a plurality of red (R), green (G), and blue (B) color filters are arranged in a matrix configuration. The liquid crystal panel 5 and the backlight assembly 10 are stacked on top of one another in a molded frame 21.

A gate printed circuit board (PCB) 7 for applying a driving signal is disposed at one edge of the liquid crystal panel 5, and a data PCB 9 for applying a graphic signal is disposed at another edge of the liquid crystal panel 5.

The backlight assembly 10 is disposed below the liquid crystal panel 5. The backlight assembly 10 includes a plurality of optical sheets 11, a lamp 13 for generating light for image display, a light guide plate 160 converting the light generated from the lamp 13 into a surface light having an area corresponding to the size of the liquid crystal panel 5, and a reflection plate 17 for reflecting upwards the light leaked through the light guide plate 15 to enhance light efficiency.

The backlight assembly 10 and the liquid crystal panel 5 are stacked and inserted into the mold frame 21 so as to protect the backlight assembly 10 and the liquid crystal panel 5 from an external impact. Also, in order to prevent the liquid crystal panel from shaking, a guide panel 3 is provided to fix the liquid crystal panel 5 in place.

Also, the mold frame 21 that receives the liquid crystal panel 5 and the backlight assembly 10 is coupled to a case top 1 and a bottom cover 22, respectively.

FIG. 2 illustrates a schematic view of the backlight assembly according to the related art.

Referring to FIG. 2, the lamp 13 is disposed on an edge of the light guide plate 15 and fixed by a lamp housing 13a.

The light guide plate 15 becomes thinner from a light incidence region to a light emission region. The optical sheets 11 including a diffusion sheet and a prism sheet are stacked onto the light guide plate 15.

The lamp 13 is fixed at the light incidence region of the light guide plate 15 by the lamp housing 13a, and the lamp housing 13a is attached on and fixed to an edge of the light incidence region of the light guide plate 15.

Light that is incident from the lamp 13 is reflected toward the light emission region of the light guide plate 15 by the prism sheet disposed above or below the light guide plate 15 and progresses toward an upper direction of the light guide plate 15.

The reflection plate 17 disposed below the light guide plate 15 reflects the light travelling from the bottom of the light guide plate 15 toward the optical sheets 11.

The diagrammatic appearance of the light guide plate constructed as above is illustrated in FIGS. 3A and 3B. Specifically, FIG. 3A is a plane view of the general prism light guide plate and FIG. 3B is a sectional view of the light guide plate illustrated in FIG. 3A.

As illustrated in FIGS. 3A and 3B, the prism light guide plate 15 has a structure in which the bottom surface has a plurality of prisms continuously formed in a lateral direction with respect to a vertical center axis.

Thus, because a sectional structure of the prism light guide plate 15 at the light incidence region is the same as those at the light emission region, the light that is incident toward the light incidence region from the lamp 13 is reflected at a predetermined angle such that the reflected light is transferred to an overall area of the light guide plate 15.

The prisms disposed on the bottom surface of the prism light guide plate 15 have an angle inclined by less than 5 degrees in left and right directions with respect to a vertical central axis from the light incidence region to the light emission region. In other words, because the prisms are arranged almost parallel with one another, the light that is incident from the lamp 13 is reflected with a uniform angle throughout the whole area of the light guide plate 15.

However, the related art LCD having the above construction has a disadvantage that light efficiency is lowered because the light generated from the lamp of the backlight assembly is incident into the light guide plate, then converted into a surface light, and the converted surface light is radiated onto the liquid crystal panel to display an image. In other words, only 30% of the light generated from the lamp is used for image display of the liquid crystal panel.

Considering the above-described low light efficiency, development on more efficient image display device capable of solving the disadvantages of the related art image display device is desired.

SUMMARY OF THE INVENTION

Accordingly, the present invention is directed to an image display device and an operating method thereof that substantially obviate one or more problems due to limitations and disadvantages of the related art.

An advantage of the present invention is to provide an image display device and an operating method thereof that can use a light beam efficiently by generating light beams for image display and making the generated light beams be incident into a light guide plate to display an image.

Additional advantages, objects, and features of the invention will be set forth in part in the description which follows and in part will become apparent to those having ordinary skill in the art upon examination of the following or may be learned from practice of the invention. Other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an image display device including: an image signal controller generating a driving signal and an image data signal; an image light beam supply unit generating image light beams using the signal applied from the image signal controller; and a light guide plate having a mapping plate reflecting the light beams that are incident from the image light beam supply unit and a display plate receiving the light beams reflected by the mapping plate to display an image.

In another aspect of the present invention, there is provided an image display device including: an image signal controller providing an image control signal; an image light beam supply unit emitting red (R), green (G) and blue (B) light beams using the image control signal applied by the image signal controller; and a light guide plate which receives the light beams provided from the image light beam supply unit to display an image using the received light beams.

In another aspect of the present invention, there is provided a method of operating an image display device, the method including: generating an image control signal; emitting red (R), green (G) and blue (B) light beams using the generated image control signal at an image light beam supply unit; and displaying an image on a light guide plate using the light beams which are emitted from the image light beam supply unit and incident into the light guide plate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 illustrates a schematic view of an exemplary image display device according to the present invention;

DETAILED DESCRIPTION OF THE ILLUSTRATED EMBODIMENTS

Figure 1:
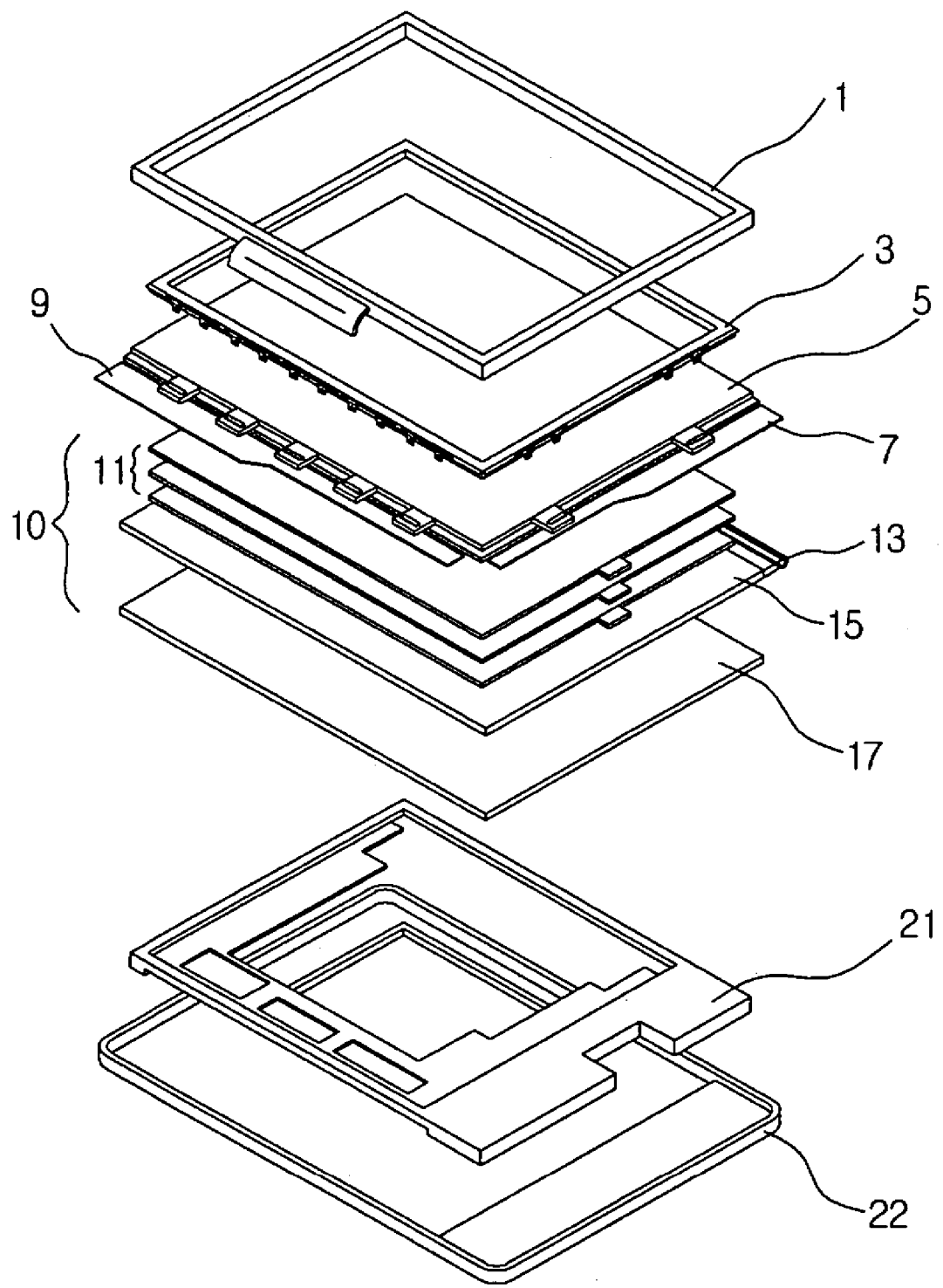
FIG. 1 illustrates an exploded perspective view of a related art LCD.
Figure 2:
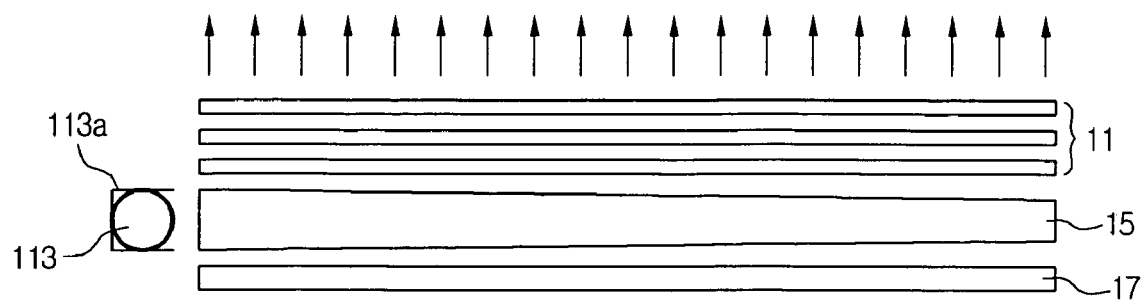
FIG. 2 illustrates a schematic view illustrating a structure of a related art backlight assembly.
Figure 3A:
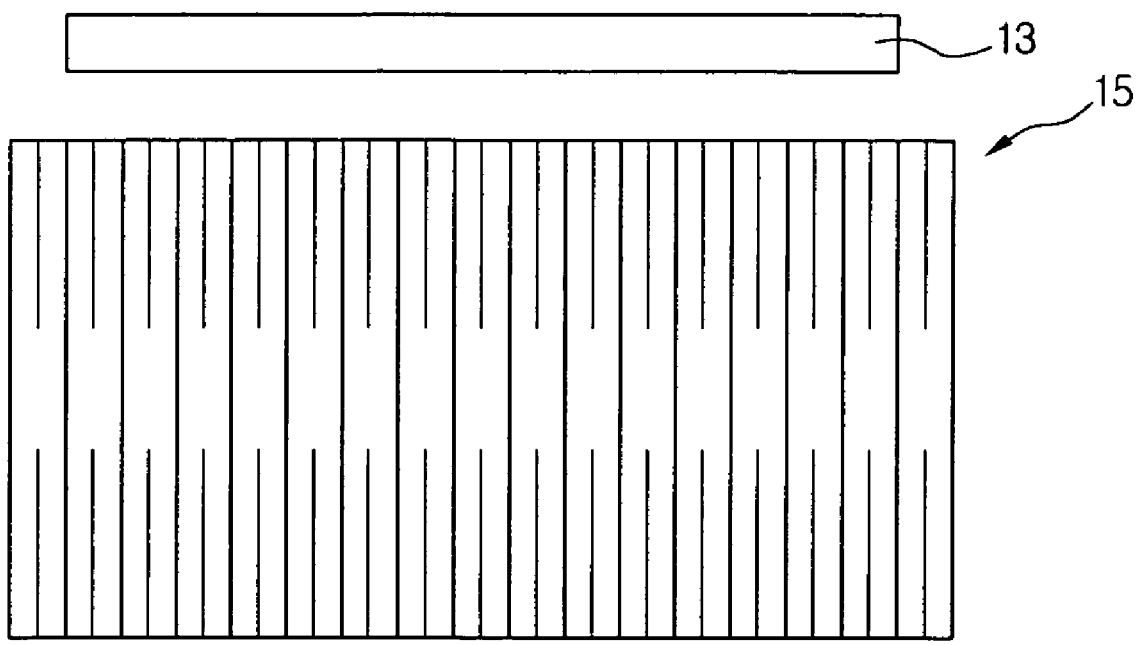
FIG. 3A illustrates a plane view of a general prism light guide plate and FIG. 3B is a sectional view of the light guide plate illustrated in FIG. 3A.
Figure 3B:

Reference will now be made in detail to an embodiment of the present invention, example of which is illustrated in the accompanying drawings.

FIG. 4 is a schematic view of an exemplary image display device according to the present invention.

Referring to FIG. 4, the image display device includes an image signal controller 100, an image light beam supply unit 120, and a light guide plate 200.

The image signal controller 100 functions to generate driving signals and image data signals for image display and control the generated signals. The image light beam supply unit 120 generates image light beams of red (R), green (G) and blue (B) using image control signals provided by the image signal controller 100. The light guide plate 200 reflects the image light beams that are incident from the image light beam supply unit to display an image.

The image light beam supply unit 120 includes two or more self-luminescent light means. For example, the image light beam supply unit 120 may be made using an organic EL (electroluminescent lamp) or an LED (light emitting diode) such that it can emit R, G and B colored light according to the image control signals generated by the image signal controller 100. When the image light beam supply unit 120 is made using a plurality of ELs or a plurality of LEDs, the ELs or LEDs may be arranged in a matrix configuration.

The function of the image signal controller 100 to generate an image signal and control the generated image signal may be realized by employing the operational principle of a general LCD to generate a driving signal and a data signal for image display.

By employing such an operational principle, driving signal and data signal may be applied to the image light beam supply unit 120 from the image signal controller 100. Light emission means of the image light beam supply unit 120 which receives the image control signal from the image signal controller 100 emits color light beams corresponding to an image intended to display. Accordingly, the R, G and B image light beams generated by the image light beam supply unit 120 are incident into the light guide plate 200.

The light guide plate 200 includes a mapping plate 170 and a display plate 150. The display plate 150 displays an image, and the mapping plate 170 reflects the image light beams incident from the image light beam supply unit 120 toward the display plate 150.

Figure 5:
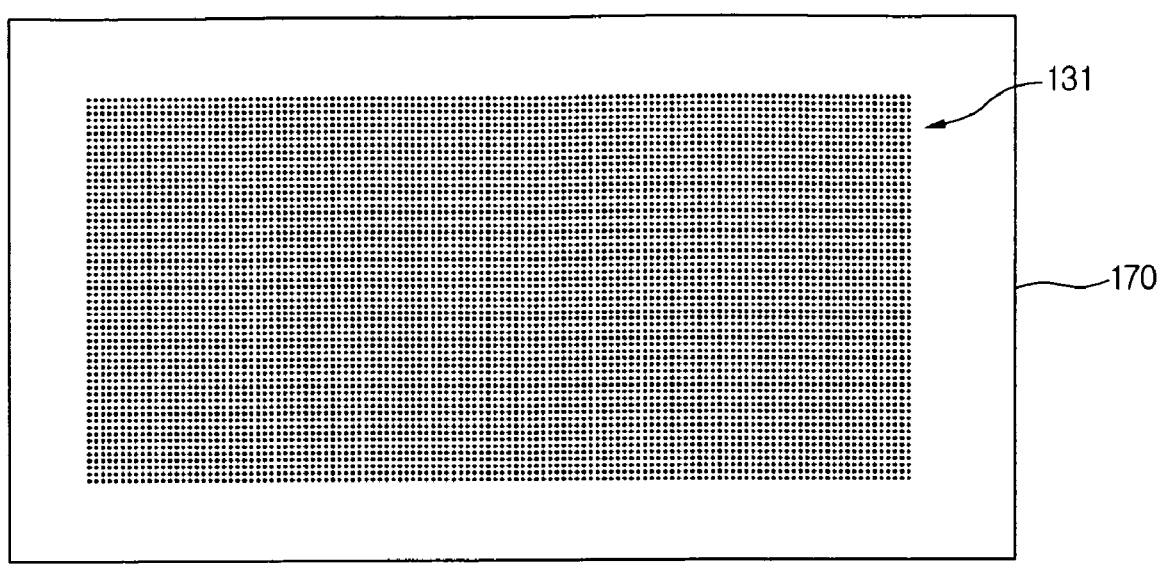
FIG. 5 illustrates a plane view of a mapping plate of an exemplary image display device according to the present invention.

The mapping plate 170 has a plurality of reflection grooves (see 131 of FIG. 5) arranged in a matrix configuration, for reflecting the image light beams incident in each pixel unit from the image light beam supply unit 120 toward the display plate 150. FIG. 5 is a plane view of the mapping plate 170 of the image display device according to the present invention.

As described above, the mapping plate 170 of the light guide plate 200 reflects the image light beams emitted in each pixel unit from the image light beam supply unit 120 toward the display plate 150 in each pixel unit such that the reflected light beams are displayed on the display plate 150. To achieve this, the mapping plate 170 has two or more reflective grooves 131 arranged in a matrix configuration for reflecting the light beams incident from the image light beam supply unit 120.

In addition, the mapping plate 170 is disposed below the light guide plate 200 so as to have a constant slope with respect to the image light beams incident from the image light beam supply unit 120. Accordingly, the image light beams reflected by the mapping plate 170 are incident onto the display plate 150 disposed on an upper surface of the light guide plate 200. By doing so, images may be displayed on the display plate 150 by the light beams incident from the image light beam supply unit 120.

Figure 6:
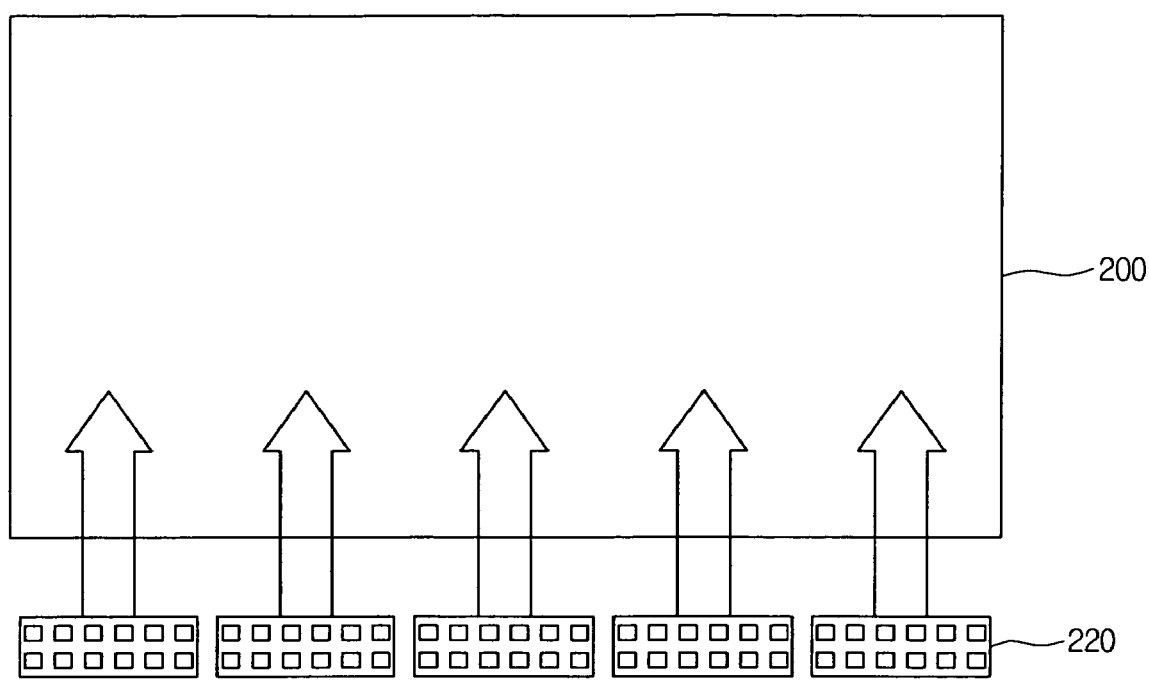
FIGS. 6 and 7 illustrates schematic views illustrating an image display method of an exemplary image display device according to the present invention.
Figure 7:
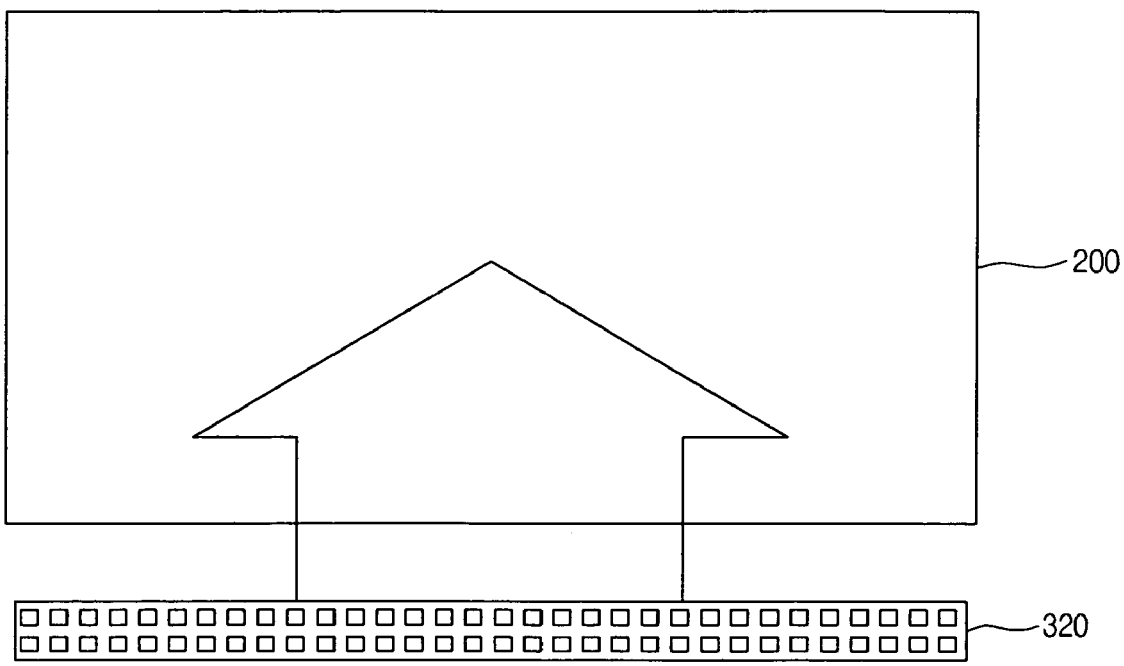

Next, a method for displaying an image in the image display device will be described with reference to FIGS. 6 and 7. FIGS. 6 and 7 are schematic views illustrating an image display method of an exemplary image display device according to the present invention.

The image light beam supply unit employed in the image display device according to the present invention may be implemented in a number of variations. FIG. 6 illustrates an example of an image light beam supply unit 220 configured in multi-blocks, and FIG. 7 illustrates an example of an image light beam supply unit 320 configured in a single block.

In other words, FIG. 6 illustrates an example of an image light beam supply unit 220 according to the present invention configured in multi-blocks each of which is self-luminescent (i.e. it generates and emits its own light) so as to project image light beams onto the light guide plate and display an image. In the image light beam supply unit illustrated in FIG. 6, the self-luminescent light means corresponding to each block may employ an LED or an organic EL.

FIG. 7 illustrates an example of an image light beam supply unit 320 according to the present invention configured in a single block that is self-luminescent so as to emit image light beams onto the light guide plate and display an image. The single block constituting the image light beam supply unit 320 has a size, which is determined so as to cover a longer direction of the light guide plate 200 on which the image light beam is displayed.

On exemplary image display method in particular will now be described.

In this example, it is assumed that the image to be displayed has a size of 768×1024. It is understood that the present invention contemplates applications to images of a variety of different sizes and resolutions.

In an example, light beams corresponding to 96 lines out of 768 lines are formed in a first direction to make a unit block constituting an image light beam supply unit. At this time, with respect to the 1,024 lines in the transverse direction, a light beam is provided every line. In other words, the image light beam supply unit is implemented using 8 blocks consisting of 96×1,024 light beams, but the size of each block may be changed variously depending on a design rule and an operating method.

In addition, 8 blocks supplying 96 image signals are disposed at the light incident region of the light guide plate and then the image light beams are projected onto the light guide plate according to a predetermined time delay.

When it is assumed that one image frame is displayed in a time unit of 16.7 ms like the general image display device, the image display device of the present invention sequentially drives the 8 blocks generating image light beams at a period of 2.1 ms. In other words, 16.7 ms is divided into 8 sections each being 2.1 ms, 96 gate lines are driven within 2.1 ms, and then a refresh operation to a next block is repeated 8 times, thereby implementing one image frame.

Accordingly, 8 blocks having 96 gate lines provide 96×1,024 image signals for 2.1 ms, which is repeated 8 times, thereby realizing a screen of 768×1,024 XGA.

At this time, the time interval, 2.1 ms is greater than the luminescence time of a general CRT, 0.3 ms. Accordingly, upon considering the residual image effect by a human being's eye, the time interval of 2.1 ms indicates that there exists a sufficient marginal time. Because this marginal time enables a selective division of the time unit according to the resolution of an image in adjusting the resolution of the image to be displayed, the division number of the unit time can flexibly correspond with the picture quality according to the property of the image to be displayed.

In addition, the light beams from the image light beam supply unit are processed not to have 8 blocks but rather to have a single block and the image light beams are projected without a time delay such that an image is displayed on the display plate of the light guide plate.

Comparing the image display device of the present invention with the related art LCD, because the image display device of the present invention displays an image directly on the light guide plate without the liquid crystal panel, the fabrication cost may be reduced and lightweight and slim profile becomes possible.

Also, the related art LCD can use only about 5 to 7% of the light generated by the lamp but the image display device of the present invention can use more than 90% of the image light for image display, so that light efficiency is increased.

It will be apparent to those skilled in the art that various modifications and variation may be made in the present invention without departing from the spirit or scope of the invention. Thus, it is intended that the present invention cover the modifications and variations of this invention provided they come within the scope of the appended claims and their equivalents.

What is claimed is:

1. An image display device comprising:
   an image signal controller generating a driving signal and an image data signal;
   an image light beam supply unit including a plurality of light means arranged in a matrix configuration, the plurality of light means each corresponding to pixel unit and generating one of red, green and blue image light beams corresponding to image data signal under the control of the driving signal from the image signal controller; and
   a light guide plate having a mapping plate including a plurality of reflection grooves corresponding to the pixel unit each for reflecting the light beams that are incident from the image light beam supply unit and a display plate disposed on the mapping plate for displaying the light beams reflected by the mapping plate to display an image.

2. The image display device of claim 1, wherein the image light beam supply unit comprises two or more blocks each having the plurality of light means.

3. The image display device of claim 1, wherein the light means comprises organic electroluminescent lamps (ELs) or light-emitting diodes (LEDs).

4. An image display device comprising:
   an image signal controller providing an image control signal;
   an image light beam including a plurality of light means arranged in a matrix configuration, the plurality of light means each corresponding to pixel unit and supply one of red (R), green (G) and blue (B) light beams under the control of the image control signal from the image signal controller; and
   a light guide plate having a mapping plate including a plurality of reflection grooves corresponding to the pixel unit each for reflecting the light beams that are incident from the image light beam supply unit and a display plate disposed on the mapping plate for displaying the light beams reflected by the mapping plate to display an image.

5. The image display device of claim 4, wherein the image light beam supply unit comprises two or more blocks each having the plurality of light means.

6. The image display device of claim 4, wherein the light means comprises organic ELs or LEDs.

7. A method of operating an image display device, the method comprising:

generating a driving signal and an image data signal;

generating red (R), green (G) and blue (B) light beams corresponding to image data signal under the control of the driving signal at an image light beam supply unit, the image light beam supply unit including a plurality of light means arranged in a matrix configuration and the plurality of light means each corresponding to pixel unit;

reflecting the light beams that are incident from the image light beam supply unit at a mapping plate, the mapping plate including a plurality of reflection grooves corresponding to the pixel unit; and displaying an image on a display plate using the light beams reflected by the mapping plate, the display plate disposed on the mapping plate.

8. The method of claim 7, wherein the image light beam supply unit comprises two or more blocks each having the plurality of light means, and is sequentially driven in a unit of the two or more blocks.

9. The method of claim 7, wherein the image light beam supply unit comprises a single block having the plurality of light means.

* * * * *